Feb. 8, 1955 G. R. HUTCHINSON 2,701,670
SIDE MOUNT TIRE CARRIER
Filed Sept. 25, 1953 2 Sheets-Sheet 1

INVENTOR.
GEORGE R. HUTCHINSON
BY
McMorrow, Berman & Davidson
ATTORNEYS

Feb. 8, 1955 G. R. HUTCHINSON 2,701,670
SIDE MOUNT TIRE CARRIER
Filed Sept. 25, 1953 2 Sheets-Sheet 2
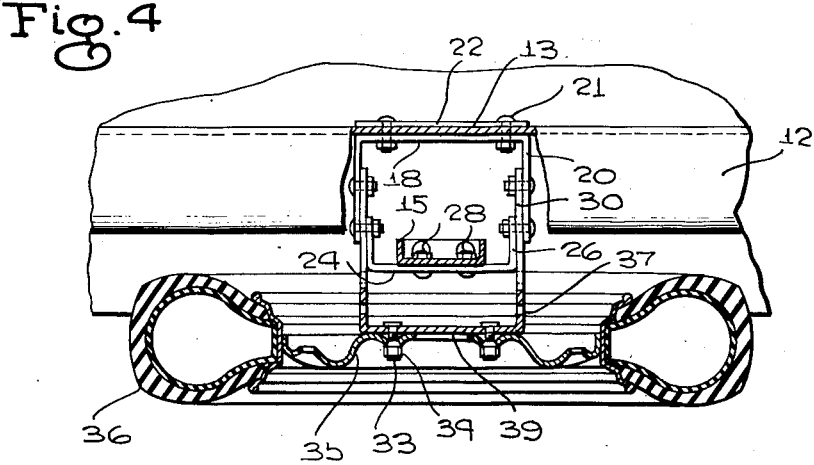
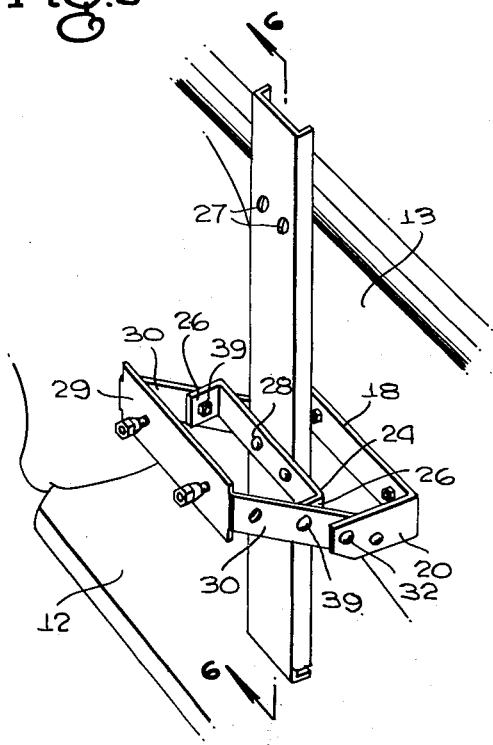
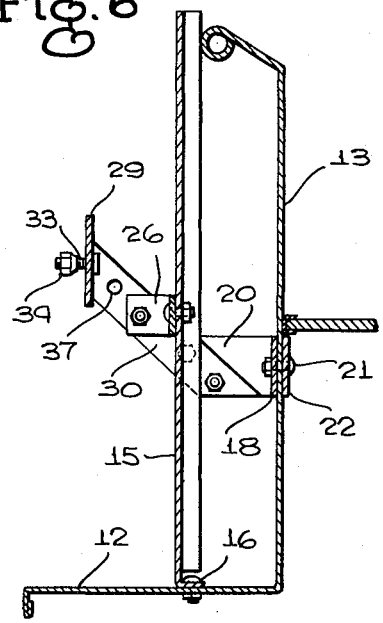
INVENTOR.
GEORGE R. HUTCHINSON
BY
*McMorrow, Berman & Davidson*
ATTORNEYS United States Patent Office 2,701,670
Patented Feb. 8, 1955

2,701,670

SIDE MOUNT TIRE CARRIER

George R. Hutchinson, Shreveport, La.

Application September 25, 1953, Serial No. 382,258

3 Claims. (Cl. 224—42.32)

This invention relates to motor vehicle spare tire rack structures, and more particularly to an improved rack structure for supporting a spare tire at the side of a truck body.

The main object of the invention is to provide a novel and improved spare tire carrier for use with a pickup truck of the type provided with a running board, the improved spare tire carrier being simple in construction, being easy to install, and being adjustable for installation on different designs of truck bodies.

A further object of the invention is to provide an improved spare tire rack for use on pickup trucks, said rack being inexpensive to fabricate, being rugged in construction, being adjustable vertically and laterally so that the spare tire may be supported in the most convenient location on the truck body, and being neat in appearance.

Further objects and advantages of the invention will become apparent from the following description and claims, and from the accompanying drawings, wherein:

Figure 4 is an enlarged horizontal cross sectional view taken on the line 4—4 of Figure 1.

Figure 5 is a perspective view, similar to Figure 2, but showing the rack arranged to support a spare tire in a relatively lowered position with respect to the running board of the truck.

Figure 6 is a vertical cross sectional view taken on the line 6—6 of Figure 5.

Figure 1:
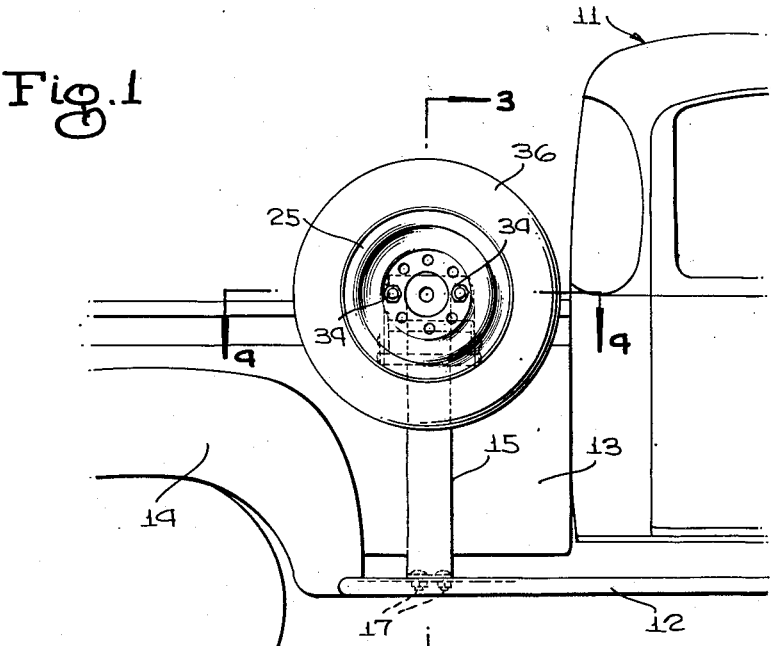
Figure 1 is a side elevational view of a fragmentary portion of a truck body provided with an improved spare tire carrying rack according to the present invention, showing a spare tire mounted on the rack in a relatively elevated position relative to the running board of the truck.

Referring to the drawings, 11 designates a pickup truck of the type having a running board 12 located adjacent the bottom edge of the side wall 13 of the truck and extending to the rear fender 14 of said truck. Designated at 15 is a vertical channel-shaped support member provided at its bottom end with a flange 16 which is secured to the running board 12 by the bolts 17. Designated at 18 is a U-shaped bracket member having the bight portion 19 and the outwardly extending arms 20, 20, said bight portion being secured to the wall 13 of the truck body, as by the bolts 21, said bolts extending through a bearing plate 22 provided at the inside of wall 13, through the wall 13, and through the bight portion 18, the bolts being then fastened by means of nuts 23.

Designated at 24 is a U-shaped bracket member having the bight portion 25 and the respective end flanges 26, 26. The upper portion of the vertical channel-shaped support member 15 is provided with a pair of apertures 27, 27, and the bight portion 25 of the bracket member 24 is secured transversely to the channel member by bolts 28 extending through said bight portion and through the apertures 27.

Figure 3:
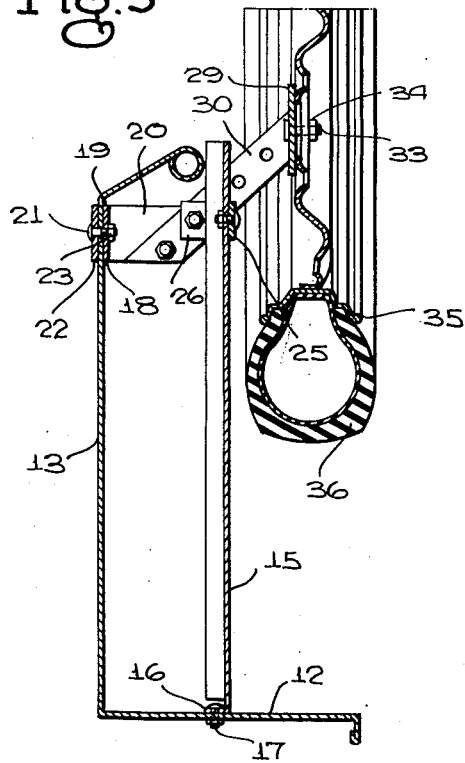
Figure 3 is an enlarged fragmentary vertical cross sectional view taken on the line 3—3 of Figure 1.
Figure 2:
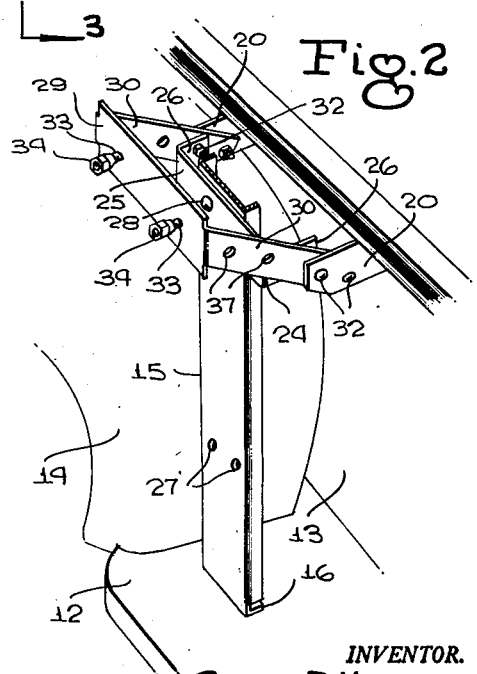
Figure 2 is a perspective view, partly in horizontal cross section, of the tire carrier rack employed in Figure 1.

In the arrangement shown in Figures 1 to 4, the bracket member 24 is secured to the support member 15 with the flanges 26, 26 directed inwardly, said flanges being substantially at the same elevation as the arms 20, 20 of bracket member 18. Designated at 29 is a vertical plate member disposed parallel to the bight portion 25 of bracket member 24 and to the vertical support member 15 and being spaced outwardly therefrom. Integrally secured to the ends of the plate member 29 are the respective inclined arms 30, 30, said arms being inclined downwardly, being received between the respective flange elements 26, 20 and being secured thereto by means of bolts 32.

Rigidly secured in the plate member 29 are the threaded, outwardly projecting stud elements 33 adapted to extend through diametrically opposed stud openings in the hub portion of a vehicle wheel 35 carrying a spare tire 36, whereby the wheel and tire may be supported on the rack and retained thereon by suitable nuts 34 threadedly engaged on the threaded studs 33.

The arms 30, 30 are provided with longitudinally spaced apertures 37 for receiving the bolts 32 and arranged so that the plate member 29 may be secured in several adjusted positions relative to the support member 15. The support member 15 is similarly provided with additional bolt-receiving openings 27' at its lower portion for fastening the bracket member 24 thereto in a lowered position, by means of bolts 28, as shown in Figures 5 and 6.

In the arrangement shown in Figures 5 and 6, the flanges 26, 26 of the bracket member 24 are directed outwardly and the bight portion 25 of the bracket member 24 is secured to the lower portion of the vertical support member 15. The plate member 29 is thus supported in a relatively lowered position as compared with the arrangement shown in Figures 1 to 4. The bracket member 18 is, of course, fastened to the wall of the truck in a relatively lowered position in the arrangement shown in Figures 5 and 6, as compared with the arrangement of Figures 1 to 4, whereby the ends of the arms 30 may be secured to the arms 20 of the bracket member 18 in substantially the same manner as in the arrangement shown in Figures 1 to 4. However, in the arrangement of Figures 5 and 6, the outwardly directed flanges 26, 26 are secured to the arms 30 by additional bolts 39 rather than by the fastening bolts 32 of the arrangement shown in Figures 1 to 4.

It will be readily apparent that the spare tire rack structure above described provides considerable flexibility in supporting a spare tire and its associated wheel on truck bodies of widely varying designs, since the tire and wheel may be supported in a number of adjusted positions, adjusted vertically or laterally with respect to the running board, fender and body side wall.

While a specific embodiment of an improved side mounting tire carrying rack has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle body, a running board adjacent the bottom edge of a side wall of said body, a vertical support member spaced outwardly from said wall, means securing the bottom end of said vertical support member to said running board, bracket means secured to said wall, respective outwardly extending arms on said bracket means at opposite sides of said support member, a vertical plate member disposed parallel to said support member and spaced outwardly therefrom on the side of said support member opposite said bracket means, respective arms connected to the ends of said plate member, means securing said last-named arms to said first-named arms, means connecting said second-named arms to said vertical support member, and bolt means engaged with said plate member for securing a spare wheel to said plate member parallel to said wall over said running board.

2. In a motor vehicle body, a running board adjacent the bottom edge of a side wall of said body, a vertical support member spaced outwardly from said wall, means securing the bottom end of said vertical support member to said running board, bracket means secured to said wall, respective outwardly extending arms on said bracket means at opposite sides of said support member, a vertical plate member disposed parallel to said support member and spaced outwardly therefrom on the side of said support member opposite said bracket means, respective inclined arms connected to the ends of said plate member, means securing said last-named arms to said first-named arms, a horizontal bar member, means securing said horizontal bar member transversely to said support member, respective flanges on the ends of said bar member, means connecting said flanges to the intermediate portions of said second-named arms, and bolt means engaged with said plate member for securing a spare wheel to said plate member parallel to said wall over said running board.

3. In a motor vehicle body, a running board adjacent the bottom edge of a side wall of said body, a vertical channel-shaped support member spaced outwardly from said wall, means securing the bottom end of said vertical support member to said running board, a U-shaped bracket member secured to said wall, said bracket member having its arms disposed at opposite sides of said support member, a vertical plate member disposed parallel to said support member and spaced outwardly therefrom on the side of said support member opposite said bracket member, respective inclined arms connected to the ends of said plate member, means securing said last-named arms to said first-named arms, a horizontal bar member, means securing said horizontal bar member transversely to the support member, respective flanges on the ends of said bar member, means connecting said flanges to the intermediate portions of said second-named arms, and bolt means engaged with said plate member for securing a spare wheel to said plate member parallel to said wall over said running board.

References Cited in the file of this patent

UNITED STATES PATENTS

| | | |
|---|---|---|
| 1,364,442 | Lawrence | Jan. 4, 1921 |
| 1,593,441 | Cosgrove | July 20, 1926 |
| 1,629,478 | Clark | May 24, 1927 |
| 2,621,837 | Etbauer | Dec. 16, 1952 |